US012643385B2

(12) United States Patent
Yoshida

(10) Patent No.: US 12,643,385 B2
(45) Date of Patent: Jun. 2, 2026

(54) VEHICLE-BODY FRONT STRUCTURE INCLUDING REINFORCEMENT MEMBERS

(71) Applicant: Mazda Motor Corporation, Hiroshima (JP)

(72) Inventor: Kota Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 544 days.

(21) Appl. No.: 18/109,854

(22) Filed: Feb. 15, 2023

(65) Prior Publication Data

US 2023/0264558 A1 Aug. 24, 2023

Related U.S. Application Data

(63) Continuation of application No. 18/109,363, filed on Feb. 14, 2023.

(Continued)

(30) Foreign Application Priority Data

Feb. 24, 2022 (JP) ................................. 2022-026685
Feb. 24, 2022 (JP) ................................. 2022-026690

(Continued)

(51) Int. Cl.
*B60K 1/04* (2019.01)
*B60L 3/00* (2019.01)
(Continued)

(52) U.S. Cl.
CPC .............. *B60K 1/04* (2013.01); *B60L 3/0007* (2013.01); *B60L 50/66* (2019.02); *B62D 21/02* (2013.01);
(Continued)

(58) Field of Classification Search
CPC .... B62D 25/085; B62D 25/081; B62D 25/20; B62D 25/082; B62D 25/14; B62D 25/16;
(Continued)

(56) References Cited

U.S. PATENT DOCUMENTS 5,501,289 A * 3/1996 Nishikawa ............... B60K 1/04
280/783
8,336,658 B2 * 12/2012 Rawlinson ............... B60K 1/04
429/96
(Continued)

FOREIGN PATENT DOCUMENTS

DE      102020003013 B3    3/2021
EP          3608210 A1    2/2020
(Continued)

OTHER PUBLICATIONS

Japanese Office Action issued Feb. 4, 2025, in corresponding Japanese Patent Application No. 2022-026690, 4pp.

(Continued)

*Primary Examiner* — James M Dolak
(74) *Attorney, Agent, or Firm* — XSENSUS LLP

(57) ABSTRACT

A vehicle-body front structure for an electric vehicle includes a front-side battery frame which extends in a vehicle width direction, a pair of left and right side frames and which extend forward from the front-side battery frame, a cross member between the left and right side frames and, and reinforcement members and which extend toward vehicle rear from the cross member toward the front-side battery frame.

20 Claims, 8 Drawing Sheets

Related U.S. Application Data

(60) Provisional application No. 63/445,026, filed on Feb. 13, 2023.

(30)  Foreign Application Priority Data

| | | | |
|---|---|---|---|
| Feb. 24, 2022 | (JP) | ................................. | 2022-026703 |
| Feb. 24, 2022 | (JP) | ................................. | 2022-026708 |
| Feb. 24, 2022 | (JP) | ................................. | 2022-026710 |

(51) Int. Cl.

| | |
|---|---|
| *B60L 50/60* | (2019.01) |
| *B62D 21/02* | (2006.01) |
| *B62D 21/11* | (2006.01) |
| *B62D 21/15* | (2006.01) |
| *B62D 25/08* | (2006.01) |
| *B62D 25/20* | (2006.01) |
| *H01M 50/242* | (2021.01) |
| *H01M 50/249* | (2021.01) |
| *B60L 53/12* | (2019.01) |

(52) U.S. Cl.
CPC ............. *B62D 21/11* (2013.01); *B62D 21/15* (2013.01); *B62D 21/152* (2013.01); *B62D 21/157* (2013.01); *B62D 25/08* (2013.01); *B62D 25/20* (2013.01); *H01M 50/242* (2021.01); *H01M 50/249* (2021.01); *B60K 2001/0438* (2013.01); *B60L 53/12* (2019.02); *H01M 2220/20* (2013.01)

(58) Field of Classification Search
CPC ........................... B62D 25/2036; B62D 25/08; B62D 25/2018; B62D 21/152; B62D 21/15; B62D 21/11; B62D 21/155; B62D 21/157; B62D 21/02; B62D 24/00; B60N 2/015; B60N 2/005; B60N 2/00; B60L 50/60; B60L 50/50; B60L 50/00; B60L 50/66; B60L 3/0007; B60K 1/04; B60K 1/00; B60K 2001/0416; B60K 2001/0438; H01M 2220/20; H01M 50/242; H01M 50/20; H01M 50/249
See application file for complete search history.

(56)  References Cited

U.S. PATENT DOCUMENTS

| | | | | |
|---|---|---|---|---|
| 8,479,858 | B2 * | 7/2013 | Kodaira | B62D 21/17 180/68.5 |
| 8,561,743 | B2 * | 10/2013 | Iwasa | B62D 25/2036 180/68.5 |
| 8,608,230 | B2 * | 12/2013 | Young | B62D 21/157 296/187.02 |
| 8,668,248 | B2 * | 3/2014 | Ishizono | B62D 25/025 296/70 |
| 8,702,161 | B2 * | 4/2014 | Charbonneau | B62D 21/157 296/187.12 |
| 8,733,487 | B2 * | 5/2014 | Usami | B62D 21/11 180/68.5 |
| 8,833,839 | B2 * | 9/2014 | Young | B62D 25/025 296/187.08 |
| 9,259,998 | B1 * | 2/2016 | Leanza | B62D 25/20 |
| 9,281,505 | B2 * | 3/2016 | Hihara | B62D 25/20 |
| 9,926,017 | B1 * | 3/2018 | Hamilton | B62D 21/02 |
| 9,937,781 | B1 * | 4/2018 | Bryer | B62D 35/02 |
| 10,112,470 | B2 * | 10/2018 | Hamilton | B62D 25/20 |
| 10,131,381 | B2 * | 11/2018 | Ashraf | B62D 63/025 |
| 10,259,506 | B2 * | 4/2019 | Ayukawa | B62D 25/025 |
| 10,279,693 | B2 * | 5/2019 | Shimizu | B60L 50/66 |
| 10,421,345 | B2 * | 9/2019 | Kerspe | B60P 3/20 |
| 10,589,790 | B2 * | 3/2020 | Ayukawa | B62D 21/152 |
| 10,597,081 | B2 * | 3/2020 | Ayukawa | B62D 25/2018 |
| 10,632,827 | B2 * | 4/2020 | Ajisaka | B62D 25/08 |
| 10,688,856 | B2 * | 6/2020 | Kasai | B60K 1/04 |
| 10,752,292 | B2 * | 8/2020 | Kawase | B62D 21/157 |
| 10,780,923 | B2 * | 9/2020 | Caliskan | B60N 2/015 |
| 10,829,156 | B2 * | 11/2020 | Otoguro | B62D 25/20 |
| 10,894,469 | B2 * | 1/2021 | Page | B62D 21/02 |
| 10,938,007 | B2 * | 3/2021 | Wesche | H01M 50/242 |
| 10,988,186 | B2 * | 4/2021 | Makowski | B60K 6/22 |
| 11,040,740 | B2 * | 6/2021 | Grottke | B62D 27/065 |
| 11,059,519 | B2 * | 7/2021 | Persson | B62D 21/02 |
| 11,124,244 | B2 * | 9/2021 | Kim | B62D 25/02 |
| 11,148,721 | B2 * | 10/2021 | Liu | B62D 21/08 |
| 11,173,776 | B2 * | 11/2021 | Sasaki | B60K 1/04 |
| 11,214,310 | B2 * | 1/2022 | Hong | B62D 25/025 |
| 11,220,298 | B2 * | 1/2022 | Matsuda | B62D 25/20 |
| 11,279,409 | B2 * | 3/2022 | Shimizu | B62D 21/152 |
| 11,485,416 | B2 * | 11/2022 | Lian | B62D 25/2018 |
| 11,565,578 | B2 * | 1/2023 | Shimizu | B60K 1/04 |
| 11,571,965 | B2 * | 2/2023 | Shimanaka | F01N 13/001 |
| 11,691,495 | B2 * | 7/2023 | Tatsuwaki | H01M 50/249 180/68.5 |
| 11,753,077 | B2 * | 9/2023 | Kellner | B62D 29/008 180/291 |
| 12,145,653 | B2 * | 11/2024 | Sotty | B62D 25/2045 |
| 12,220,980 | B2 * | 2/2025 | Lee | B60K 1/04 |
| 12,246,773 | B2 * | 3/2025 | Ganzhorn | B62D 21/155 |
| 12,246,777 | B2 * | 3/2025 | Tanaka | B60K 1/00 |
| 12,371,104 | B2 * | 7/2025 | Yoshida | B62D 21/15 |
| 12,388,132 | B2 * | 8/2025 | Wang | H01M 10/613 |
| 12,388,138 | B2 * | 8/2025 | Guo | B60K 1/04 |
| 12,388,145 | B2 * | 8/2025 | Handing | H01M 50/244 |
| 12,391,108 | B2 * | 8/2025 | Korada | B60L 50/64 |
| 12,401,078 | B2 * | 8/2025 | Ishitobi | B60L 50/64 |
| 12,451,551 | B2 * | 10/2025 | Burja | B60R 16/04 |
| 12,503,171 | B2 * | 12/2025 | Erber | B60K 1/04 |
| 12,533,940 | B2 * | 1/2026 | Reich | B60K 5/12 |
| 2012/0223113 | A1 * | 9/2012 | Gaisne | H01M 50/249 224/538 |
| 2018/0065461 | A1 * | 3/2018 | Maier | B62D 25/2018 |
| 2020/0047811 | A1 | 2/2020 | Shimizu | |
| 2021/0101464 | A1 * | 4/2021 | Matsushima | B60N 2/005 |
| 2023/0182821 | A1 | 6/2023 | Ganzhorn et al. | |

FOREIGN PATENT DOCUMENTS

| | | |
|---|---|---|
| JP | 2009-101952 A | 5/2009 |
| JP | 2009-132260 A | 6/2009 |
| JP | 2013-159223 A | 8/2013 |
| JP | 2013-203241 A | 10/2013 |
| JP | 2020-23243 A | 2/2020 |
| WO | 2021/233600 A1 | 11/2021 |

OTHER PUBLICATIONS

Extended European search report issued on Jun. 23, 2023, in corresponding European patent Application No. 23157163.9, 6 pages.

\* cited by examiner

VEHICLE-BODY FRONT STRUCTURE INCLUDING REINFORCEMENT MEMBERS

CROSS-REFERENCE TO RELATED APPLICATIONS

The present application is a continuation of U.S. patent application Ser. No. 18/109,363 filed on Feb. 14, 2023, which claims priority to Provisional Ser. No. 63/445,026, filed on Feb. 13, 2023, which claims benefit of Japanese Patent Application 2022-026685, filed Feb. 24, 2022, Japanese Patent Application 2022-026690, filed Feb. 24, 2022, Japanese Patent Application 2022-026703, filed Feb. 24, 2022, Japanese Patent Application 2022-026708, filed Feb. 24, 2022, and Japanese Patent Application 2022-026710, filed Feb. 24, 2022, the entire contents of each of which are incorporated herein by reference.

BACKGROUND

Field

The present disclosure relates to a vehicle-body front structure for an electric vehicle, for example.

Description of Related Art

For example, in a vehicle-body front portion of an automobile which is disclosed in Patent Literature 1, a pair of left and right front side frames extending in a vehicle front-rear direction are provided, and a front sub-frame is provided below those front side frames and in rear of an engine room. In a left-side front end portion and a right-side front end portion of the front sub-frame, a left pipe frame and a right pipe frame are respectively provided to extend toward vehicle front. The left pipe frame and the right pipe frame are inclined with respect to a center line extending in a front-rear direction of a vehicle so as to be positioned on vehicle-width-direction outer sides toward a front side.

Patent Literature 1 discloses that the left pipe frame and the right pipe frame are inclined to be positioned on the vehicle-width-direction outer sides toward the front side and an impact load can thereby properly be absorbed in a case of an offset collision in which the impact load is input from oblique front of the vehicle.

CITATION LIST

Patent Literature

[Patent Literature 1] Japanese Patent Laid-Open No. 2009-101952

SUMMARY

Problems to be Solved in order to enhance collision safety in a pole collision in which an automobile collides head-on with a pole extending perpendicularly, for example, sufficient absorption of an impact load is needed in addition to absorption of an impact load in an offset collision. In this point, because in a vehicle in which an engine in related art is installed, many accessory components such as intake-and-exhaust system components are disposed together with the engine in an engine room in a vehicle-body front portion, in a case where a local and large impact load as in the pole collision is input, the impact load is absorbed by deforming the accessory components as well.

However, in an electric vehicle having no engine, because a traveling motor smaller than an engine is often installed in a space corresponding to an engine room in related art and not as many accessory components as an engine are necessary, an entrance amount of a pole in the pole collision may increase.

The present disclosure has been made in consideration of such problems, one or more embodiments is directed to reducing an entrance amount of a pole in a pole collision in an electric vehicle.

To solve the above and other problems, a first aspect of the present disclosure can be based on a vehicle-body front structure for an electric vehicle which includes a traveling motor and in which a battery casing housing a battery supplying electric power to the traveling motor is disposed below a floor panel. The vehicle-body front structure includes: a front-side battery frame which is provided in a front portion of the battery casing and extends in a vehicle width direction; a pair of left and right side frames which extend from the front-side battery frame toward vehicle front; a cross member which is suspended between a portion in the left side frame, the portion being spaced apart from the front-side battery frame to the vehicle front, and a portion in the right side frame, the portion being spaced apart from the front-side battery frame to the vehicle front; and a reinforcement member which extends toward vehicle rear from the cross member toward the front-side battery frame.

In this configuration, in a case where a pole collision is presumed, a pole which has entered possibly exerts a rearward impact load on the cross member. The cross member on which the rearward impact load is exerted is apt to be bent rearward, but because the reinforcement member is provided which extends toward the front-side battery frame positioned in the rear of the cross member, the cross member is supported from the rear by the reinforcement member. Accordingly, because it becomes possible to transmit the impact load to the front-side battery frame, deformation of the cross member is inhibited, and further an entrance amount of the pole is reduced.

In a second aspect of the present disclosure, the left and right side frames extend to be positioned on vehicle-width-direction outer sides toward front. In this configuration, in a case where a left side offset collision is presumed in which an impact load is input from obliquely left front, for example, because the left side frame extends so as to correspond to an input direction of the impact load, the impact load from the obliquely left front is input generally along an axis direction of the left side frame, and the impact load is absorbed by the left side frame. In addition, the impact load input to the left side frame is transmitted to the front-side battery frame and is thus also absorbed by the front-side battery frame. The same applies to a right side offset collision.

In a third aspect of the present disclosure, the vehicle-body front structure may include a frame bracket which couples rear portions of the left and right side frames with the front-side battery frame. In this case, a rear portion of the reinforcement member can abut the frame bracket.

In this configuration, because the rear portion of the reinforcement member can be supported from the rear by the frame bracket, an effect of inhibiting deformation of the cross member on which a rearward impact load is exerted can be enhanced.

The reinforcement member according to a fourth aspect of the present disclosure may include a left-side reinforcement member and a right-side reinforcement member which are provided at a distance from each other in the vehicle width direction. The left-side reinforcement member and the right-side reinforcement member can be provided to be positioned on vehicle-width-direction outer sides toward rear.

In this configuration, because the cross member on which a rearward impact load is exerted can firmly be supported by the left-side reinforcement member and the right-side reinforcement member, an effect of inhibiting deformation of the cross member on which the rearward impact load is exerted can further be enhanced.

In a fifth aspect of the present disclosure, a configuration can be made such that on a vehicle-width-direction outer side of the frame bracket, a suspension arm which configures a front suspension apparatus is supported to be swingable.

In this configuration, because a portion which supports the suspension arm is provided to the frame bracket, rigidity of the whole frame bracket can be enhanced.

A front portion of the traveling motor according to a sixth aspect of the present disclosure can be positioned in vehicle rear of a front portion of the cross member.

In this configuration, a pole which has entered in a collision contacts the cross member before the pole contacts the traveling motor. Accordingly, an effect of inhibiting entrance of the pole by the cross member and the reinforcement member is sufficiently exhibited.

In the cross member according to a seventh aspect of the present disclosure, an intermediate portion in the vehicle width direction may be formed to be positioned below a lower surface of the side frames. Further, the reinforcement member may extend from the intermediate portion of the cross member in the vehicle width direction toward the front-side battery frame through a portion below the side frames.

In this configuration, because the reinforcement member and the side frames are laid out to be aligned in a height direction, it becomes easy to achieve both of such arrangement that the side frames are positioned on the vehicle-width-direction outer sides toward the front and such arrangement that the reinforcement member extends toward the front-side battery frame.

As described above, a reinforcement member is provided which extends from a cross member suspended between left and right side frames toward a front-side battery frame. Accordingly, even in an electric vehicle, an entrance amount of a pole in a pole collision can be reduced.

BRIEF DESCRIPTION OF THE DRAWINGS

The scope of the present disclosure is best understood from the following detailed description of exemplary embodiments when read in conjunction with the accompanying drawings.

4

Figure 6:
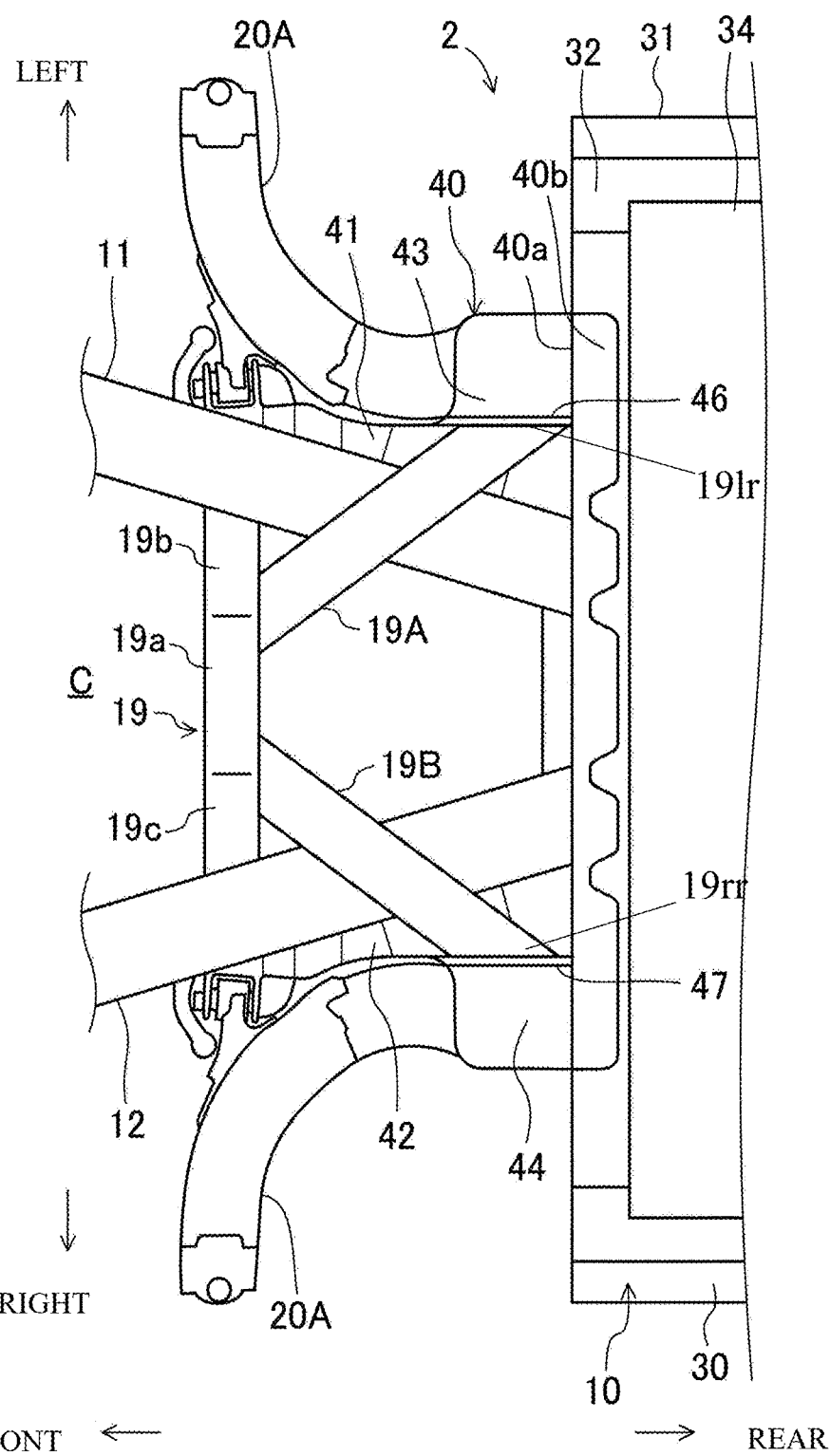

FIG. 6 is an enlarged bottom view of the front-side portion of the lower structure, from which the power train, shock absorbers, springs, hubs, and so forth are omitted for clarity.

Figure 7:
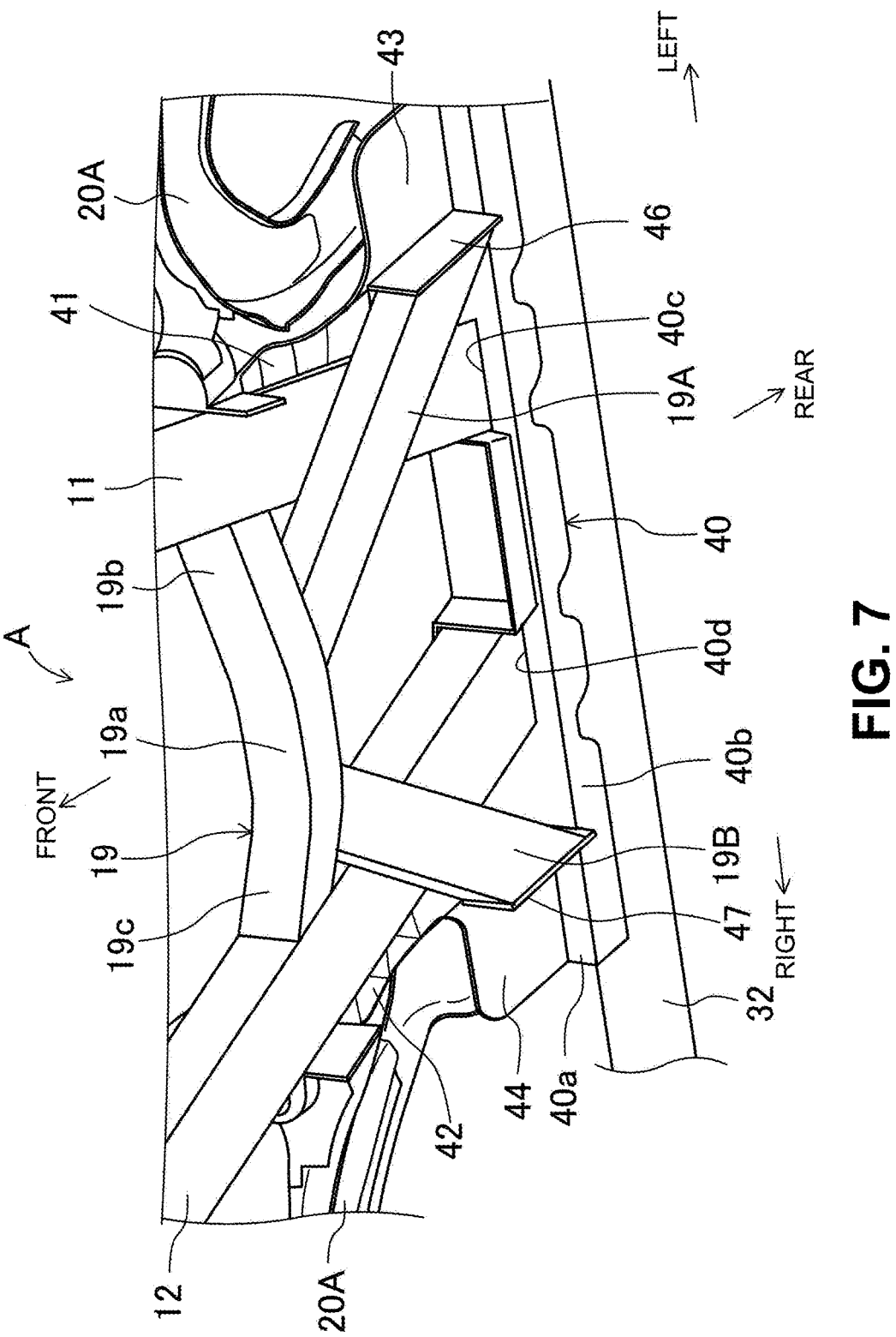

FIG. 7 is a perspective view of a periphery of rear-side portions of front side frames as seen from below.

Figure 8:
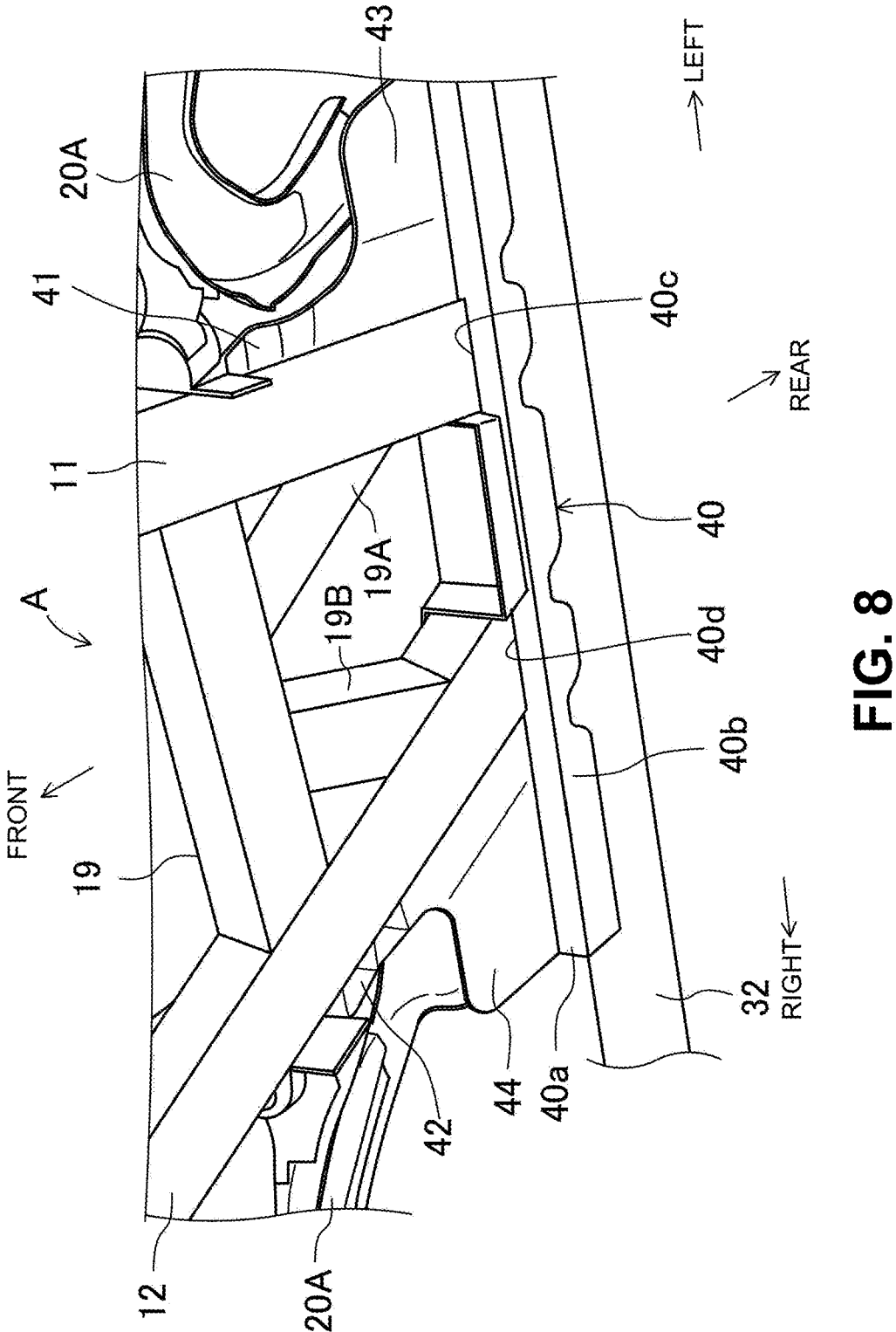

FIG. 8 is a diagram which corresponds to FIG. 7 and is according to a modification example.

DETAILED DESCRIPTION

An embodiment will hereinafter be described in detail based on drawings. Note that the description in the following is substantially only about examples and is not at all intended to restrict the present disclosure, applications thereof, or uses thereof.

Figure 1:
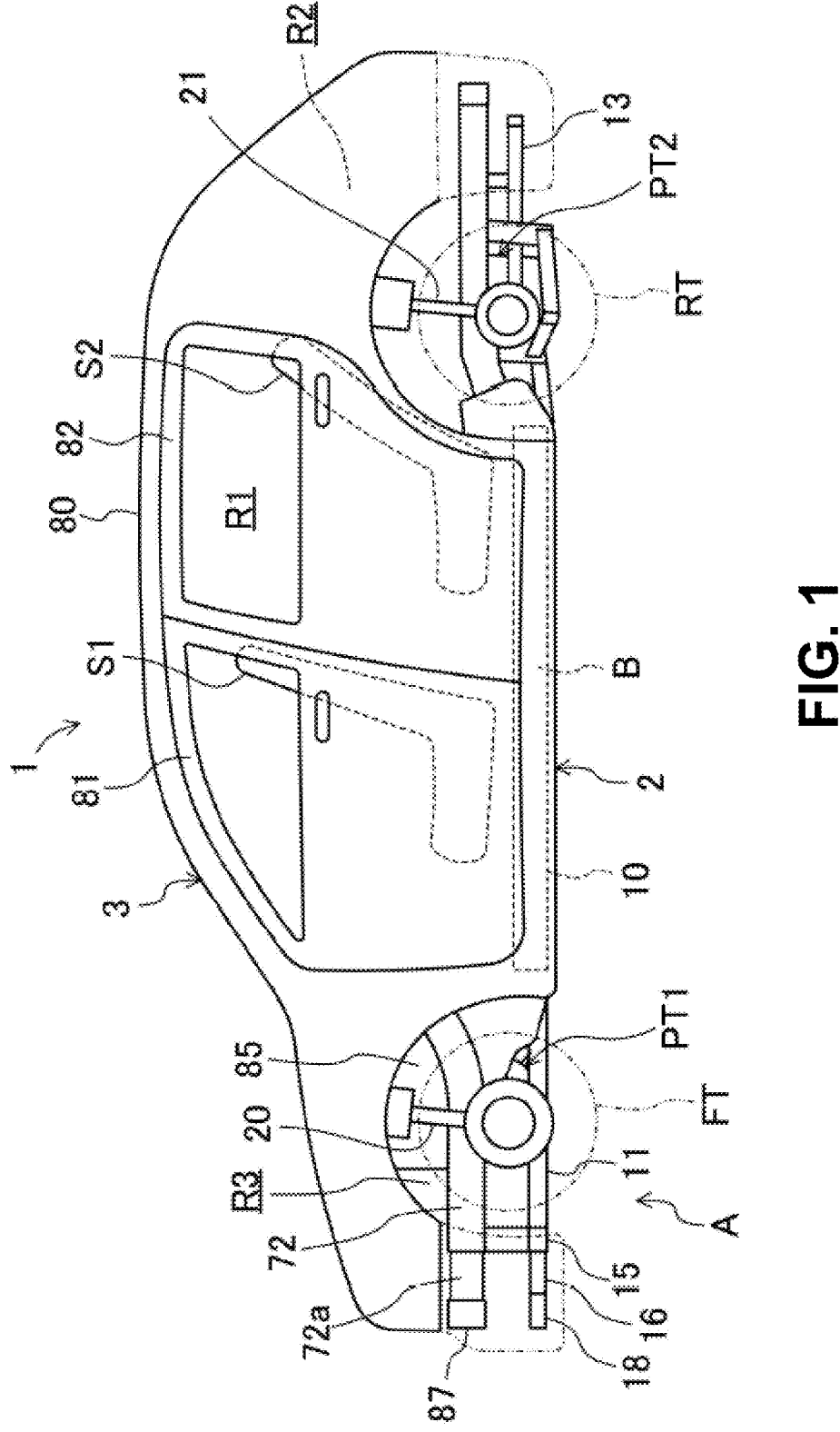
FIG. 1 is a side view of an electric vehicle according to an embodiment, in which a part of the electric vehicle is omitted for clarity.
Figure 2:
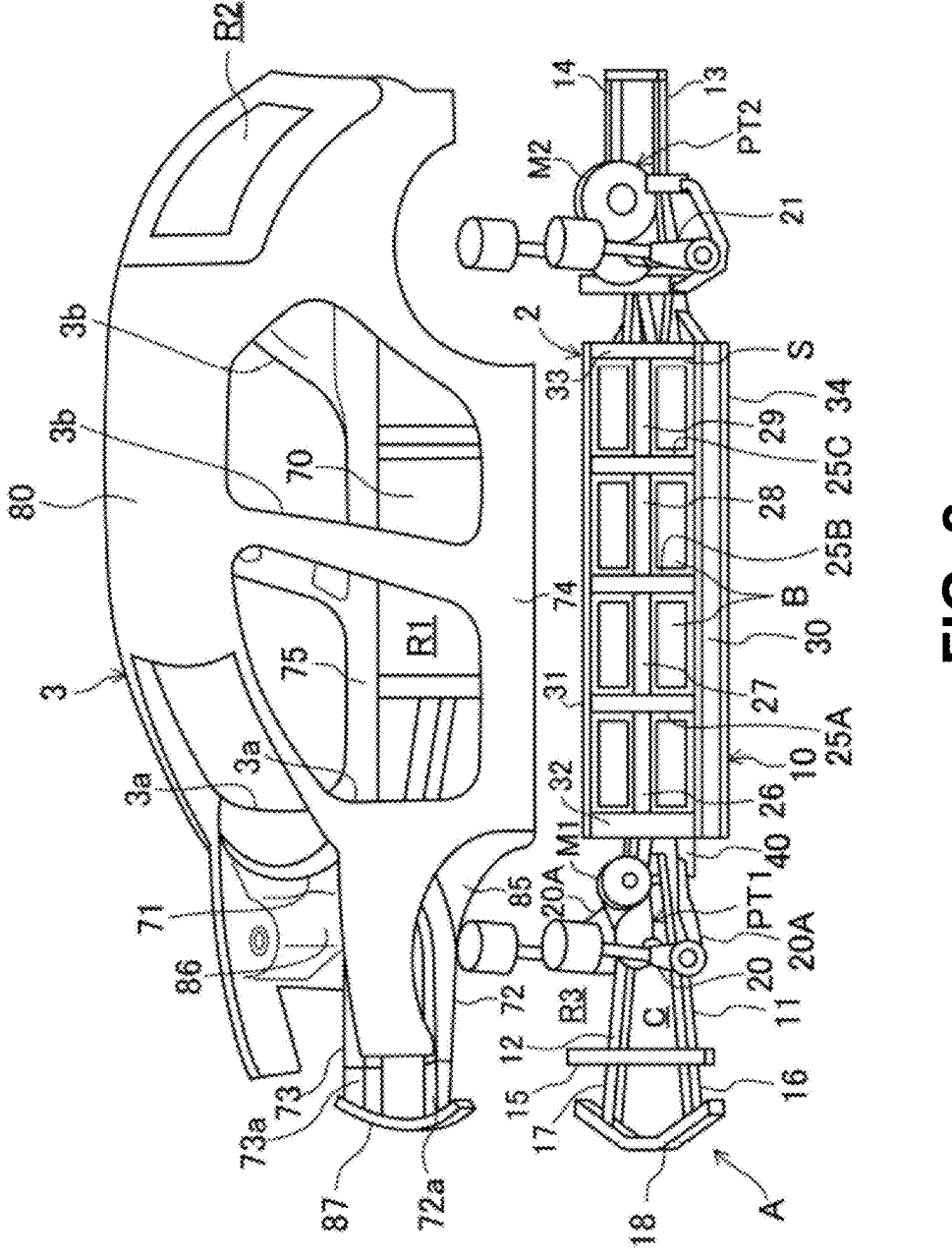
FIG. 2 is a side view illustrating a state where the electric vehicle is divided into a lower structure and an upper structure.

FIG. 1 is a left side view of an electric vehicle (electric automobile) 1 including a vehicle-body front structure A according to the embodiment. As illustrated in FIG. 2, the electric vehicle 1 includes a lower structure 2 and an upper structure 3. In FIG. 1, a front bumper, a rear bumper, front and rear wheels, and so forth are omitted and are illustrated by imaginary lines, and each portion is schematically illustrated. In FIG. 2, in addition to the components omitted in FIG. 1, doors, a bonnet hood, a front fender, window glass, front and rear lighting devices, interior materials, and so forth are omitted, and each portion is schematically illustrated.

Note that in the description of the embodiment, a vehicle front side will simply be referred to as "front", a vehicle rear side will simply be referred to as "rear", a vehicle right side will simply be referred to as "right", and a vehicle left side will simply be referred to as "left". A right-left direction of the vehicle is a vehicle width direction.

As illustrated in FIG. 1, the electric vehicle 1 is a passenger automobile. The electric vehicle 1 may be of any of a sedan type, a hatch-back type, a minivan type, and so forth, and its shape is not particularly limited. As illustrated in FIG. 2, in the electric vehicle 1, a vehicle cabin R1 is formed which serves as a staying space for an occupant. As illustrated in FIG. 1, a front seat S1 is provided on a front side in the vehicle cabin R1, and a rear seat S2 is provided in rear of the front seat S1 in the vehicle cabin R1. In the rear of the rear seat S2, a trunk R2 is provided in accordance with necessity. The vehicle cabin R1 and the trunk R2 are provided to the upper structure 3. Note that in the vehicle cabin R1, only the front seat S1 may be provided, or a third row seat may be provided in the rear of the rear seat S2.

Meanwhile, a space in front of the vehicle cabin R1 as a front portion of the electric vehicle 1 can be set as a power chamber R3, for example. That is, the vehicle-body front structure A is provided to the electric vehicle 1 which includes a front-side traveling motor M1, a rear-side traveling motor M2, batteries B supplying electric power to the traveling motors M1 and M2, and a battery casing 10 housing the batteries B. The battery casing 10 is disposed below a floor panel 70 described later.

The front-side traveling motor M1 produces a driving force for driving left and right front wheels FT, and the front-side power train PT1 is configured with only the front-side traveling motor M1 or with the front-side traveling motor M1, a speed reducer, a transmission, and so forth. Further, the rear-side traveling motor M2 produces a driving force for driving left and right rear wheels RT, and a rear-side power train PT2 is configured with only the rear-side traveling motor M2 or with the rear-side traveling motor M2, a speed reducer, a transmission, and so forth.

In the present embodiment, the rear-side traveling motor M2 is configured to produce a highest output (maximum torque) which is high compared to the front-side traveling motor M1, and the rear-side traveling motor M2 has a larger size than the front-side traveling motor M1. Accompanying that, the rear-side power train PT2 becomes larger than the front-side power train PT1. Note that the rear-side traveling motor M2 may produce a highest output which is low compared to the front-side traveling motor M1, or the rear-side traveling motor M2 and the front-side traveling motor M1 may produce equivalent highest outputs. Further, only the front-side power train PT1 may be provided, or only the rear-side power train PT2 may be provided.

As illustrated in FIG. 2, the lower structure 2 includes the battery casing 10, a pair of left and right front side frames 11 and 12 which extend forward in front of the battery casing 10, and a pair of left and right rear frame 13 and 14 which extend rearward in the rear of the battery casing 10. A reference numeral 11 denotes the left front side frame, and a reference numeral 12 denotes the right front side frame. A reference numeral 13 denotes the left rear frame, and a reference numeral 14 denotes the right rear frame.

In a case of a common electric automobile, a battery casing is often formed as a separate body from a vehicle body and is often detachable from a portion below a floor; however, in the present embodiment, not only the battery casing 10 but also the left and right front side frames 11 and 12 and the left and right rear frames 13 and 14 are integrated with the battery casing 10, and the front side frames 11 and 12 and the rear frames 13 and 14 together with the battery casing 10 are detachable from the upper structure 3.

Specifically, the electric vehicle 1 of the present embodiment is configured to be capable of being divided, in an up-down direction, into the lower structure 2 having the battery casing 10 and the upper structure 3 forming the vehicle cabin R1 and the trunk R2. Being capable of being divided in the up-down direction means that without using welding, adhesion, or the like, the lower structure 2 is integrated with the upper structure 3 by using fastening members such as bolts, nuts, and screws. Accordingly, because the lower structure 2 can be separated from the upper structure 3 in accordance with necessity when maintenance or repairs are performed after the electric vehicle 1 is passed into the hands of a user, high maintainability is achieved. Note that fastening members used in the following description include bolts, nuts, screws, and so forth.

Here, as a vehicle-body structure of an automobile, a vehicle-body structure of a ladder frame type has been known. In a case of the vehicle-body structure of the ladder frame type, the vehicle-body structure is being capable of being divided, in the up-down direction, into a ladder frame and a cabin, but the ladder frame continuously extends in a front-rear direction and thus mainly receives a collision load in a front collision and a rear collision. In a side collision, the ladder frame only subsidiarily receives a collision load, and the collision load is mainly received by the cabin. As described above, in the vehicle-body structure of the ladder frame type, usually, different members receive collision loads between the front collision and rear collision and the side collision.

On the other hand, in a case of the electric vehicle 1 of the present embodiment, the lower structure 2 having the front side frames 11 and 12 and the rear frame 13 and 14 and the upper structure 3 are capable of being divided; however, a technical idea of the present embodiment is largely different from the vehicle-body structure of the ladder frame type in related art in the point that in both cases of the front collision and related art in the point that in both cases of the front collision and rear collision and the side collision, a collision load is received by the lower structure 2 and the upper structure 3, and the collision load is capable of being dispersedly absorbed by both of the structures 2 and 3. In the following, structures of the lower structure 2 and the upper structure 3 will be described in detail.

(Upper Structure)

First, the upper structure 3 will be described. As illustrated in FIG. 2, the upper structure 3 includes the floor panel 70, a dash panel 71, a pair of left and right front main frames 72 and 73, and a pair of left and right side sills 74 and 75. A reference numeral 72 denotes the left front main frame, and a reference numeral 73 denotes the right front main frame. A reference numeral 74 denotes the left side sill, and a reference numeral 75 denotes the right side sill.

The floor panel 70 configures a floor surface of the vehicle cabin R1 and is formed with a steel plate or the like which extends in the front-rear direction and extends also in the left-right direction. A space above the floor panel 70 serves as the vehicle cabin R1. A roof 80 is provided to an upper portion of the vehicle cabin R1. Further, in both of left and right side portions of the upper structure 3, front openings 3a and rear openings 3b are formed. As illustrated in FIG. 1, the front opening 3a and the rear opening 3b are capable of being opened and closed by a front door 81 and a rear door 82, respectively. A front door and a rear door may be disposed on a right side of the upper structure 3 to be capable of being opened and closed.

The dash panel 71 is a member for partitioning the vehicle cabin R1 from the power chamber R3 in the front-rear direction. The dash panel 71 is configured with a steel plate or the like, for example, extends in the left-right direction, and extends also in an up-down direction. On both of left and right sides of a front portion of the upper structure 3, left and right front wheel well portions 85 and 86 for housing the left and right front wheels FT are respectively provided. A left end portion of the dash panel 71 is connected with the left front wheel well portion 85, and a right end portion of the dash panel 71 is connected with the right front wheel well portion 86.

The left and right front main frames 72 and 73 are disposed in a vehicle-body front portion and are highly strong members which extend in the front-rear direction. That is, the left and right front main frames 72 and 73 are positioned in front of the floor panel 70, are positioned above the floor panel 70, and are specifically disposed to extend forward from both of left and right sides in a lower portion of the dash panel 71.

The left and right front main frames 72 and 73 form a left-right symmetrical structure and can be configured by joining plural press-formed materials or can be configured with the extruded material, for example. A cross section of each of the front main frames 72 and 73 in a direction orthogonal to the front-rear direction is set larger than a cross section of each of the front side frames 11 and 12 of the lower structure 2 in the same direction. Accordingly, the front main frames 72 and 73 become thick and highly strong members compared to the front side frames 11 and 12.

Front end portions of the left and right front main frames 72 and 73 respectively have the crush cans 72a and 73a which perform compressive deformation in a front collision and absorb collision energy. The crush cans 72a and 73a are tubular members which extend in the front-rear direction. The crush cans 72a and 73a perform compressive deformation due to an impact load from the front in a phase previous to deformation of the front main frames 72 and 73 and thereby absorb the impact load. The front bumper reinforcement 87 extending in the left-right direction is fixed to front end portions of the left and right crush cans 72a and 73a.

The left and right side sills 74 and 75 are respectively disposed in both of left and right end portions of the floor panel 70 to extend in the front-rear direction. The left end portion of the floor panel 70 is connected with an intermediate portion of the left side sill 74 in the up-down direction, and the right end portion of the floor panel 70 is connected with an intermediate portion of the right side sill 75 in the up-down direction. Upper-side portions of the side sills 74 and 75 are protruded upward from connection portions with the floor panel 70, and lower-side portions of the side sills 74 and 75 are protruded downward from the connection portions with the floor panel 70. Because the battery casing 10 is arranged below the floor panel 70, the battery casing 10 is arranged such that the lower-side portions of the side sills 74 and 75 overlap with the battery casing 10 in a vehicle side view. The battery casing 10 is fixed to the side sills 74 and 75.

(Lower Structure)

Next, the lower structure 2 will be described. The lower structure 2 includes the front and rear power trains PT1 and PT2, the front wheels FT, the rear wheels RT, front suspension apparatuses 20, rear suspension apparatuses 21, and so forth in addition to the battery casing 10, the front side frames 11 and 12, and the rear frames 13 and 14. Forms of the front suspension apparatus 20 and the rear suspension apparatus 21 are not particularly specified.

The battery casing 10 is a large casing which is formed, below the floor panel 70 of the upper structure 3, to be spanned from a left end portion vicinity to a right end portion vicinity of the floor panel 70 and to be spanned from a front end portion vicinity to a rear end portion vicinity of the floor panel 70. As described above, the battery casing 10 is provided in a wide range of a lower region of the floor panel 70, and it thereby becomes possible to install the battery B with a large capacity in the electric vehicle 1. The battery B may be a lithium-ion battery, a solid-state battery, or the like or may be another secondary cell. Further, the battery B may be a so-called battery cell or may be a battery pack housing plural battery cells. In the present embodiment, the battery B is configured with a battery pack, and plural battery packs are installed in a state where those are aligned in the front-rear direction and the left-right direction.

Figure 3:
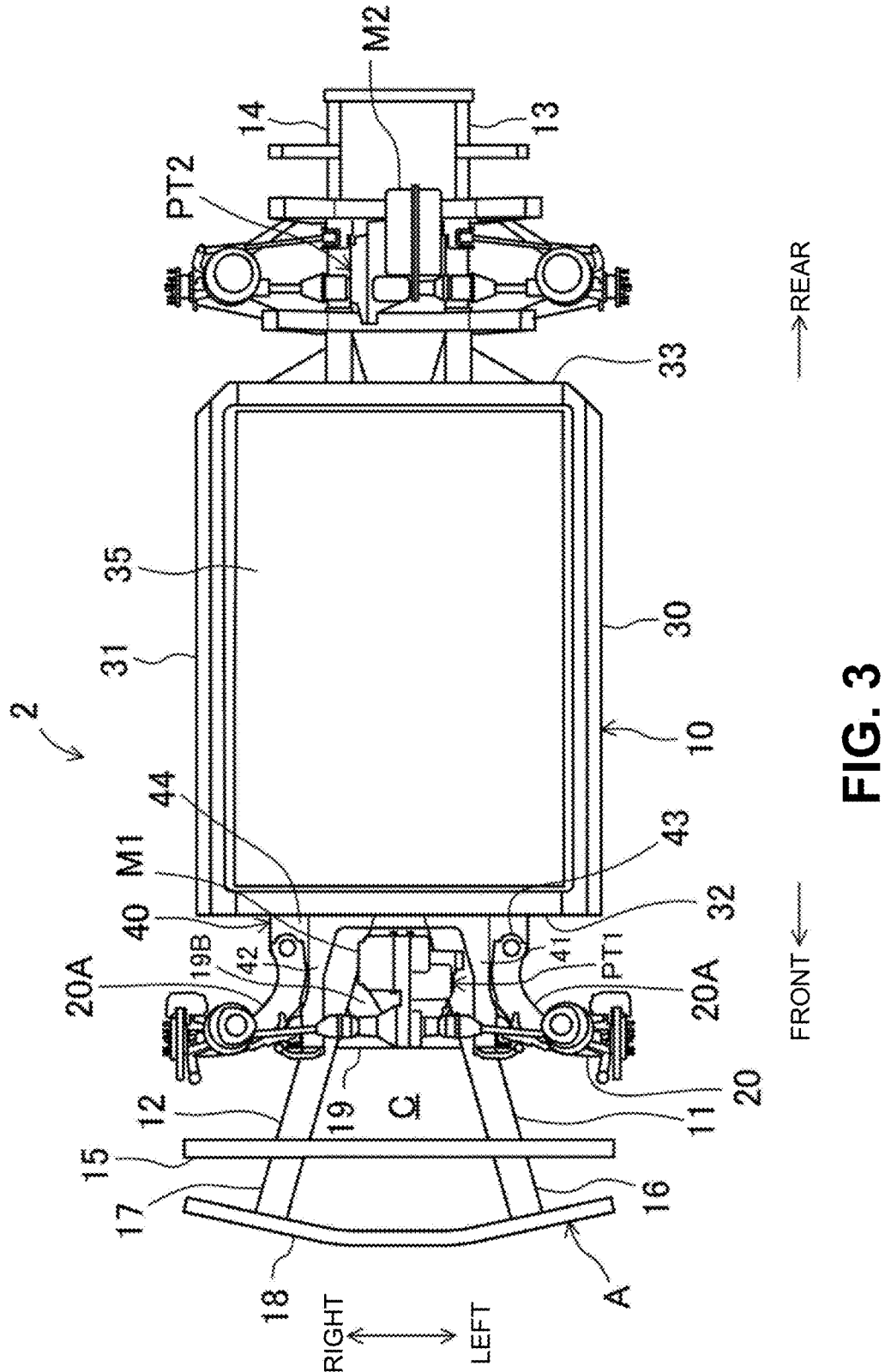
FIG. 3 is a plan view of the lower structure.

The battery casing 10 includes a left-side battery frame 30, a right-side battery frame 31, a front-side battery frame 32, a rear-side battery frame 33, a bottom plate 34, and the lid body 35 (illustrated in FIG. 3). FIG. 2 illustrates a state where the lid body 35 is detached.

The left-side battery frame 30, the right-side battery frame 31, the front-side battery frame 32, and the rear-side battery frame 33 are configured with an extruded material or the like of an aluminum alloy, for example, but may be configured with an aluminum alloy plate material or a press-formed material of a steel plate as well. The bottom plate 34 can be configured with an extruded material. In the following description, "extruded material" denotes an extruded material of an aluminum alloy, and "press-formed material" denotes an aluminum alloy plate material or a press-formed material of a steel plate. Further, each member may be configured with a casting, for example.

All of cross-sectional shapes of the left-side battery frame 30, the right-side battery frame 31, the front-side battery frame 32, and the rear-side battery frame 33 in respective orthogonal directions to their longitudinal directions are rectangular shapes. Further, the left-side battery frame 30, the right-side battery frame 31, the front-side battery frame

32, and the rear-side battery frame 33 are all arranged at the same height and extend in generally horizontal directions.

The left-side battery frame 30 is provided to a left-side portion of the battery casing 10 and extends in the front-rear direction. The right-side battery frame 31 is provided to a right-side portion of the battery casing 10 and extends in the front-rear direction. The rear-side battery frame 33 is provided to a rear portion of the battery casing 10 and extends in the left-right direction.

A left end portion of the front-side battery frame 32 is connected with a front end portion of the left-side battery frame 30, and a right end portion of the front-side battery frame 32 is connected with a front end portion of the right-side battery frame 31. A left end portion of the rear-side battery frame 33 is connected with a rear end portion of the left-side battery frame 30, and a right end portion of the rear-side battery frame 33 is connected with a rear end portion of the right-side battery frame 31. Consequently, the left-side battery frame 30, the right-side battery frame 31, the front-side battery frame 32, and the rear-side battery frame 33 form a rack which surrounds all of the batteries B in a plan view.

The bottom plate 34 extends generally horizontally and is fixed to lower surfaces of the left-side battery frame 30, the right-side battery frame 31, the front-side battery frame 32, and the rear-side battery frame 33. Further, the lid body 35 is fixed to the lower surfaces of the left-side battery frame 30, the right-side battery frame 31, the front-side battery frame 32, and the rear-side battery frame 33. Consequently, a battery housing space S housing the batteries B (illustrated in FIG. 2) is marked off and formed with the left-side battery frame 30, the right-side battery frame 31, the front-side battery frame 32, the rear-side battery frame 33, the bottom plate 34, and the lid body 35.

The size of the battery housing space S can be changed in accordance with the capacity of the installed batteries B. The size of the battery housing space S is capable of being easily changed by changing lengths of the left-side battery frame 30, the right-side battery frame 31, the front-side battery frame 32, and the rear-side battery frame 33 and a shape of the bottom plate 34. For example, in a case where the electric vehicle 1 is a small vehicle which has a short wheelbase and narrow treads, the left-side battery frame 30, the right-side battery frame 31, the front-side battery frame 32, the rear-side battery frame 33 are made short, the shapes of the bottom plate 34 and the lid body 35 are made small in response to the shortening, and the battery housing space S thereby becomes small in accordance with the small vehicle. On the other hand, in a case of a large vehicle, the left-side battery frame 30, the right-side battery frame 31, the front-side battery frame 32, and the rear-side battery frame 33 are made long, the shapes of the bottom plate 34 and the lid body 35 are made large in response to the elongation, and the battery housing space S thereby becomes large in accordance with the large vehicle. In a case where the left-side battery frame 30, the right-side battery frame 31, the front-side battery frame 32, and the rear-side battery frame 33 are configured with the extruded material, the lengths can easily be changed. Further, the bottom plate 34 can be configured with the extruded material, and its shape can thereby easily be changed.

An upper portion of the battery housing space S may be closed by the above lid body 35 or may be closed by the floor panel 70 of the upper structure 3. In the battery housing space S, other than the batteries B, a cooling device cooling the batteries B, a heating device heating the batteries B, and so forth (temperature adjustment devices) can also be provided. Further, electric power of the batteries B is supplied to the traveling motors M1 and M2 via a control device. In addition, it is possible to charge the batteries B via a charging socket, a contactless charger, or the like.

As illustrated in FIG. 2, in the internal portion of the battery casing 10, as strength members extending in the left-right direction, first to third inside-casing members 25A, 25B, and 25C are provided. All of heights of the first to third inside-casing members 25A, 25B, and 25C are the same and are generally the same as the heights of the left-side battery frame 30 and so forth. The inside-casing members 25A, 25B, and 25C may be configured with the extruded material or may be configured with the press-formed material. In the present embodiment, three inside-casing members 25A, 25B, and 25C are provided, but the number of inside-casing members 25A, 25B, and 25C may be increased or decreased in accordance with the dimension of the battery casing 10 in the front-rear direction.

The first to third inside-casing members 25A, 25B, and 25C are arranged at distances from each other in the front-rear direction, the first inside-casing member 25A is in a foremost position, and the third inside-casing member 25C is in a rearmost position. A lower portion of each of the inside-casing members 25A, 25B, and 25C is fixed to an upper surface of the bottom plate 34. Further, a left end portion of each of the inside-casing members 25A, 25B, and 25C is fixed to an inner surface (right-side surface) of the left-side battery frame 30, and a right end portion of each of the inside-casing members 25A, 25B, and 25C is fixed to an inner surface (left-side surface) of the right-side battery frame 31. In other words, the inside-casing members 25A, 25B, and 25C are members which connect the left-side battery frame 30 and the right-side battery frame 31 together.

In the internal portion of the battery casing 10, as strength members extending in the front-rear direction, a front central member 26 and first to third rear central members (rear reinforcement members) 27 to 29 are provided. The front central member 26 and the first to third rear central members 27 to 29 are arranged at generally the same heights and are provided at a center of the battery casing 10 in the left-right direction. Lower end portions of the front central member 26 and the first to third rear central members 27 to 29 are mounted on the upper surface of the bottom plate 34.

The front central member 26 is arranged between the front-side battery frame 32 and the first inside-casing member 25A, a front end portion of the front central member 26 is fixed to a central portion of the front-side battery frame 32 in the left-right direction, and a rear end portion of the front central member 26 is fixed to a central portion of the first inside-casing member 25A in the left-right direction. Consequently, the front-side battery frame 32 is a member which extends so as to connect the front end portions of the left-side battery frame 30 and the right-side battery frame 31 with the front end portion of the front central member 26.

The first rear central member 27 is arranged between the first inside-casing member 25A and the second inside-casing member 25B, a front end portion of the first rear central member 27 is fixed to the central portion of the first inside-casing member 25A in the left-right direction, and a rear end portion of the first rear central member 27 is fixed to a central portion of the second inside-casing member 25B in the left-right direction. Further, the second rear central member 28 is arranged between the second inside-casing member 25B and the third inside-casing member 25C, a front end portion of the second rear central member 28 is fixed to the central portion of the second inside-casing member 25B in the left-right direction, and a rear end portion of the second rear central member 28 is fixed to a central portion of the third inside-casing member 25C in the left-right direction. Further, the third rear central member 29 is arranged between the third inside-casing member 25C and the rear-side battery frame 33, a front end portion of the third rear central member 29 is fixed to the central portion of the third inside-casing member 25C in the left-right direction, and a rear end portion of the third rear central member 29 is fixed to a central portion of the rear-side battery frame 33 in the left-right direction. Consequently, because the first to third inside-casing members 25A, 25B, and 25C and the front central member 26 and first to third rear central members 27 to 29 are disposed in a lattice manner in the internal portion of the battery casing 10 and are coupled with each other, a reinforcement effect for the battery casing 10 is further enhanced.

When an imaginary straight line extending in the front-rear direction is presumed in a plan view, the positions of the front central member 26 and the first to third rear central members 27 to 29 in the left-right direction are set such that the positions are arranged on the imaginary straight line. In other words, the first to third rear central members 27 to 29 are provided to be positioned on a rearward imaginary extension line of the front central member 26. Note that the front central member 26 and the first to third rear central members 27 to 29 may be configured with one member which is continuous in the front-rear direction.

Figure 4:
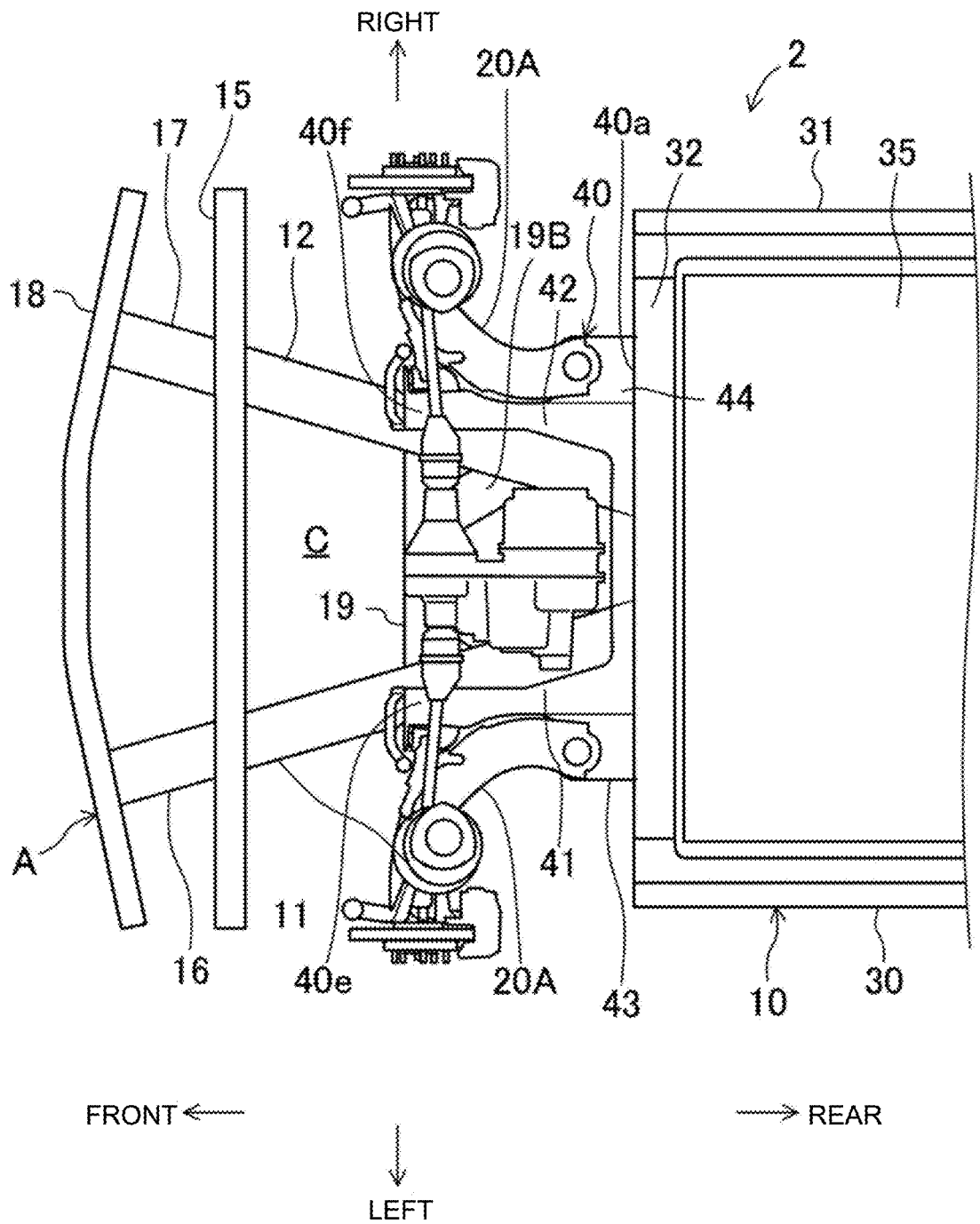
FIG. 4 is an enlarged plan view of a front-side portion of the lower structure.
Figure 5:
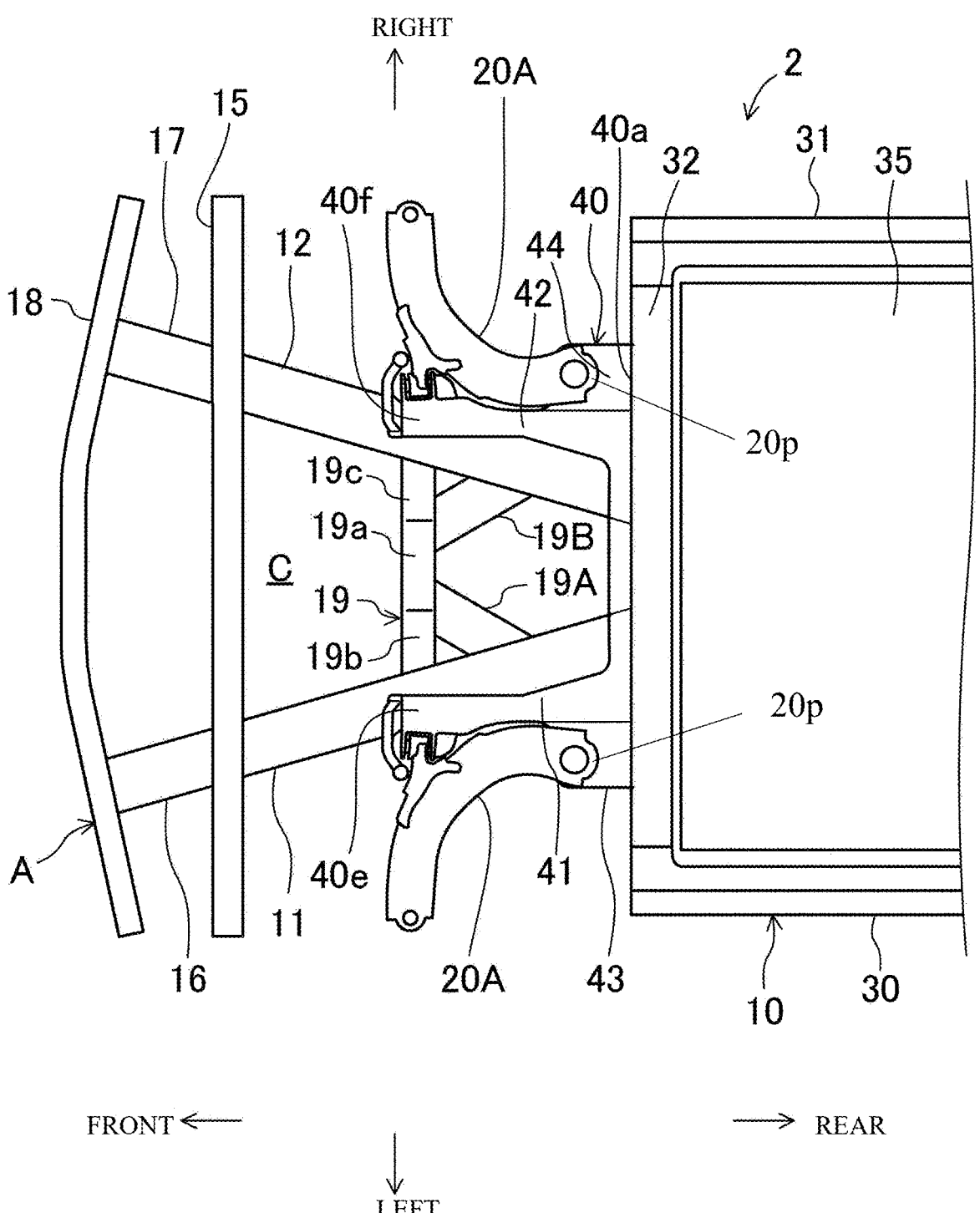
FIG. 5 is a diagram which corresponds to FIG. 4 and from which a power train, shock absorbers, springs, hubs, and so forth are omitted for clarity.

As illustrated in FIGS. 4 to 6 and so forth, the vehicle-body front structure A includes the pair of left and right front side frames 11 and 12, a frame bracket 40, a first cross member 15, a pair of left and right impact absorption members 16 and 17, and a second cross member 19. In the present embodiment, in addition to the above members, the vehicle-body front structure A includes a front member 18, reinforcement members 19A and 19B, and so forth. Members configuring the vehicle-body front structure A are not limited to the above-described members and may include other members, apparatuses, devices, and so forth.

The front side frames 11 and 12 linearly and generally horizontally extend below left and right front main frames 72 and 73 provided to the upper structure 3. The front side frames 11 and 12 can be configured with the extruded material, the press-formed material, or the like, for example. In the present embodiment, because the front side frames 11 and 12 are configured with the extruded material, their cross-sectional shapes in a direction orthogonal to the front-rear direction are generally equivalent from front end portions to rear end portions.

The left and right front side frames 11 and 12 are mounted on the front-side battery frame 32 configuring the front portion of the battery casing 10 via the frame bracket 40. In other words, rear portions of the left and right front side frames 11 and 12 are coupled with the front-side battery frame 32 by the frame bracket 40. The frame bracket 40 is an integrally formed component of metal and extends in the left-right direction along a front surface of the front-side battery frame 32. The rear portions of the left and right front side frames 11 and 12 are fixed to the frame bracket 40. Metal which configures the frame bracket 40 is not particularly limited. For example, aluminum and so forth can be raised, and in this case, the frame bracket 40 can be formed by aluminum die-casting.

The left and right front side frames 11 and 12 are mounted on the front-side battery frame 32 via the frame bracket 40, but the rear portions of the front side frames 11 and 12 are caused to adjoin the front surface of the front-side battery frame 32. Consequently, the front side frames 11 and 12 extend forward from the front-side battery frame 32. Note that the rear portion of the front side frames 11 and 12 may slightly be spaced apart forward from the front surface of the front-side battery frame 32. In this case also, viewing those as the whole, it can be considered that the front side frames 11 and 12 extend forward from the front-side battery frame 32.

The rear portion of the left front side frame 11 is arranged to correspond to a section on a left side of a center of the front-side battery frame 32 in the left-right direction. Further, the rear portion of the right front side frame 12 is arranged to correspond to a section on a right side of the center of the front-side battery frame 32 in the left-right direction. Accordingly, a distance between the rear portions of the left and right front side frames 11 and 12 becomes a predetermined distance. The distance between the rear portions of the front side frames 11 and 12 is narrower than a distance between the left-side battery frame 30 and the right-side battery frame 31 of the battery casing 10.

Heights of the left and right front side frames 11 and 12 are generally the same. Further, the left and right front side frames 11 and 12, the front central member 26 of the battery casing 10, the left-side battery frame 30, and the right-side battery frame 31 are disposed at generally the same heights.

The left and right front side frames 11 and 12 extend to be positioned on the vehicle-width-direction outer sides toward the front. That is, the left front side frame 11 is inclined, e.g., forms a negative acute angle, with respect to the imaginary straight line extending in the front-rear direction of the vehicle in a top plan view so as to be positioned on a left side toward the front. Further, the right front side frame 12 is inclined, e.g., forms a positive acute angle, with respect to the imaginary straight line extending in the front-rear direction of the vehicle in a plan view so as to be positioned on a right side toward the front. Accordingly, the distance between the left and right front side frames 11 and 12 (a separation distance in the vehicle width direction) becomes wider toward the front. A space C is formed between the left and right front side frames 11 and 12 in which all or a part of various components, apparatuses, devices, and so forth are capable of being arranged. Then, the space C has a shape which is enlarged in the vehicle width direction toward the front. Additionally, a distance of the front portions of the front side frames 11 and 12 may be narrower than a distance between the left-side battery frame 30 and the right-side battery frame 31 of the battery casing 10.

An inclination angle of the left front side frame 11 with respect to the above imaginary straight line is equivalent to an inclination angle of a right front side frame 12 with respect to the above imaginary straight line. A front portion of the left front side frame 11 is arranged on a vehicle-width-direction inner side of the left-side battery frame 30 of the battery casing 10. Further, a front portion of the right front side frame 12 is arranged on the vehicle-width-direction inner side of the right-side battery frame 31 of the battery casing 10.

Further, as illustrated in FIG. 1, positions, in the front-rear direction, of the front portions of the left and right front side frames 11 and 12 and of front portions of the left and right front main frames 72 and 73 of the upper structure 3 are set to generally the same positions.

As illustrated in FIG. 7, the frame bracket 40 includes a vertical plate portion 40*a* which extends in the vehicle width direction and the up-down direction along the front surface of the front-side battery frame 32 and a lower plate portion 40*b* which extends rearward from a lower edge portion of the vertical plate portion 40*a* along the lower surface of the front-side battery frame 32 and which extends also in the vehicle width direction. The vertical plate portion 40*a* and the lower plate portion 40*b* are fixed to the front-side battery frame 32 by fastening members or the like. In such a manner, the vertical plate portion 40*a* and the lower plate portion 40*b* of the frame bracket 40 are respectively fixed to the front surface and the lower surface of the front-side battery frame 32, and mounting rigidity of the frame bracket 40 on the front-side battery frame 32 can thereby be enhanced.

In the vertical plate portion 40*a* of the frame bracket 40, a left-side insertion hole 40*c* into which the rear portion of the left front side frame 11 is inserted and a right-side insertion hole 40*d* into which the rear portion of the right front side frame 12 is inserted are formed at a distance in the vehicle width direction. The rear portion of the left front side frame 11 is fixed to the frame bracket 40 by an adhesive, a fastening member, or the like, for example, in a state where the rear portion is inserted into the left-side insertion hole 40*c*.

As illustrated in FIG. 5, the frame bracket 40 includes a left-side upper plate portion 40*e* which extends in the front-rear direction so as to cover an upper surface of the left front side frame 11 and a right-side upper plate portion 40*f* which extends in the front-rear direction so as to cover an upper surface of the right front side frame 12. The left-side upper plate portion 40*e* and the upper surface of the left front side frame 11 are caused to adhere to each other by an adhesive, for example, and the right-side upper plate portion 40*f* and the upper surface of the right front side frame 12 are similarly caused to adhere to each other. Accordingly, the left and right front side frames 11 and 12 can firmly be fixed to the frame bracket 40.

The frame bracket 40 has a left-side support portion 41 and a right-side support portion 42, and the left-side support portion 41 and the right-side support portion 42 are integrally shaped with the vertical plate portion 40*a* and the lower plate portion 40*b*. The left-side support portion 41 is a portion which is arranged on the vehicle-width-direction outer side (left side) of the left front side frame 11 and supports the above front side frame 11 from the vehicle-width-direction outer side. Specifically, the left-side support portion 41 is protruded forward from a left-side portion of the left-side insertion hole 40*c* in the vertical plate portion 40*a* and extends along a left side surface of the left front side frame 11. A front portion of the left-side support portion 41 reaches the vicinity of a central portion of the left front side frame 11 in the front-rear direction, and it thus becomes possible to support a wide range of the left-side support portion 41 by the left-side support portion 41. It is also possible to cause the left front side frame 11 to adhere to the left-side support portion 41.

Further, the right-side support portion 42 is a portion which is arranged on the vehicle-width-direction outer side (right side) of the right front side frame 12 and supports the above front side frame 12 from the vehicle-width-direction outer side. Specifically, the right-side support portion 42 is protruded forward from a right-side portion of the right-side insertion hole 40*d* in the vertical plate portion 40*a* and extends along a right side surface of the right front side frame 12. A front portion of the right-side support portion 42 reaches the vicinity of a central portion of the right front side frame 12 in the front-rear direction, and it thus becomes possible to support a wide range of the right-side support portion 42 by the right-side support portion 42. It is also possible to cause the right front side frame 12 to adhere to the right-side support portion 42.

On the vehicle-width-direction outer side of the frame bracket 40, left and right suspension arms 20A configuring the front suspension apparatuses 20 are supported to be swingable in the up-down direction around a pivot point 20p. That is, in a portion on a left side of the left-side support portion 41 in the frame bracket 40, a left-side arm mounting portion 43 is provided to be protruded to a left side. On the left-side arm mounting portion 43, a base end portion of the left suspension arm 20A is mounted to be rotatable around a shaft extending in the front-rear direction. Further, in a portion on a right side of the right-side support portion 42 in the frame bracket 40, a right-side arm mounting portion 44 is provided to be protruded to a right side. On the right-side arm mounting portion 44, a base end portion of the right suspension arm 20A is mounted to be rotatable around a shaft extending in the front-rear direction.

The first cross member 15 is a member, which is suspended between a portion of the left front side frame 11 which is spaced apart forward from the front-side battery frame 32 and a portion of the right front side frame 12 which is spaced apart forward from the front-side battery frame 32, and linearly extends in the vehicle width direction. The first cross member 15 can also be configured with the extruded material, the press-formed member, or the like. In the present embodiment, a left-side portion of the first cross member 15 is fixed to the front portion of the left front side frame 11, and a right-side portion of the first cross member 15 is fixed to the front portion of the right front side frame 12. Consequently, the front portions of the left and right front side frames 11 and 12 are coupled with each other by the first cross member 15.

Further, the first cross member 15 is generally parallel with the front-side battery frame 32. Accordingly, in a plan view, a quadrilateral shape (a trapezoidal shape, e.g., an isosceles trapezoidal shape, in the present example) is formed with the first cross member 15, the left and right front side frames 11 and 12, and the front-side battery frame 32, and a closed cross-section is configured when a horizontal cross section is seen.

A left side of the first cross member 15 is protruded to the vehicle-width-direction outer side of the front portion of the left front side frame 11. Further, a right side of the first cross member 15 is protruded to the vehicle-width-direction outer side of the front portion of the right front side frame 12.

The second cross member 19 is a member between the first cross member 15 and the front-side battery frame 32 and is suspended between the left front side frame 11 and the right front side frame 12, and linearly extends in the vehicle width direction. The second cross member 19 can also be configured with the extruded material, the press-formed member, or the like. A dimension of the second cross member 19 in the vehicle width direction is shorter than a dimension of the first cross member 15 in the vehicle width direction As also illustrated in FIG. 7, a left end portion of the second cross member 19 is fixed to a right side surface of the left front side frame 11 by adhesion, welding, a fastening member, or the like. A right end portion of the second cross member 19 is similarly fixed to a left side surface of the right front side frame 12. Accordingly, intermediate portions of the left and right front side frames 11 and 12 in the front-rear direction are coupled with each other.

The front-side traveling motor M1 is positioned above the second cross member 19. A front portion of the front-side traveling motor M1 is positioned in vehicle rear of a front portion of the second cross member 19.

A shape of the second cross member 19 is not particularly limited, but in the present embodiment, the second cross member 19 includes an intermediate portion 19a configuring an intermediate portion in the vehicle width direction, a left-side portion 19b configuring a left side, and a right-side portion 19c configuring a right side. The intermediate portion 19a is positioned below lower surfaces of the front side frames 11 and 12. A left end portion of the left-side portion 19b is fixed to the right side surface of the left front side frame 11, and a right end portion of the right-side portion 19c is fixed to the left side surface of the right front side frame 12. The left-side portion 19b and the right-side portion 19c are inclined to be positioned lower toward the vehicle-width-direction inner sides. A right end portion of the left-side portion 19b and a left end portion of the right-side portion 19c are respectively continuous with a left end portion and a right end portion of the intermediate portion 19a. The second cross member 19 can be obtained by bending one tubular member, for example.

Further, the second cross member 19 is generally parallel with the front-side battery frame 32. Accordingly, in a plan view, a quadrilateral shape (a trapezoidal shape in the present example) is formed with the second cross member 19, the left and right front side frames 11 and 12, and the front-side battery frame 32, and a closed cross-section is configured when a horizontal cross section is seen. Further, in a plan view, a quadrilateral shape is also formed with the second cross member 19, the left and right front side frames 11 and 12, and the first cross member 15.

As illustrated in FIG. 5, in the present embodiment, a left-side reinforcement member 19A and a right-side reinforcement member 19B are provided which are provided at a distance from each other in the vehicle width direction. The left-side reinforcement member 19A and the right-side reinforcement member 19B each extend from the intermediate portion of the second cross member 19 in the vehicle width direction toward the front-side battery frame 32 through portions below the front side frames 11 and 12.

That is, the left-side reinforcement member 19A extends rearward from a portion on a left side of a central portion of the second cross member 19 in the vehicle width direction toward the front-side battery frame 32. The left reinforcement member 19A thus is inclined relative to the imaginary straight line, e.g., at a positive acute angle. Further, the right-side reinforcement member 19B extends rearward from a portion on a right side of the central portion of the second cross member 19 in the vehicle width direction toward the front-side battery frame 32. The right reinforcement member 19B thus is inclined relative to the imaginary straight line, e.g., at a negative acute angle.

Further, the left-side reinforcement member 19A and the right-side reinforcement member 19B are provided to be positioned on the vehicle-width-direction outer sides toward the rear, and rear portions 19lr, 19rr of the left-side reinforcement member 19A and the right-side reinforcement member 19B abut the frame bracket 40. Specifically, in a left-side portion of the frame bracket 40, a left-side fixing plate portion 46 protrudes downward and extends in the front-rear direction. The left-side fixing plate portion 46 is positioned in the vicinity of a boundary portion between the left-side support portion 41 and the left-side arm mounting portion 43 and extends to a lower position than a lower surface of the left-side arm mounting portion 43. A left end portion of the left-side reinforcement member 19A is fixed to a right side surface of the left-side fixing plate portion 46 by adhesion, welding, or the like. A direction in which the left-side reinforcement member 19A extends and a direction in which the left-side fixing plate portion 46 extends intersect with each other, and a range for adhesion or welding of the left end portion of the left-side reinforcement member 19A to the left-side fixing plate portion 46 is thereby widely secured.

Similarly, in a right-side portion of the frame bracket 40, a right-side fixing plate portion 47 protrudes downward and extends in the front-rear direction. The right-side fixing plate portion 47 is positioned in the vicinity of a boundary portion between the right-side support portion 42 and the right-side arm mounting portion 44 and extends to a lower position than a lower surface of the right-side arm mounting portion 44. A right end portion of the right-side reinforcement member 19B is fixed to a left side surface of the right-side fixing plate portion 47 by adhesion, welding, or the like. A direction in which the right-side reinforcement member 19B extends and a direction in which the right-side fixing plate portion 47 extends intersect with each other, and a range for adhesion or welding of the left end portion of the right-side reinforcement member 19A to the right-side fixing plate portion 46 is thereby widely secured.

The left impact absorption member 16 is provided in front of the left front side frame 11 and is configured with a tubular member which extends forward. Further, the right impact absorption member 17 is provided in front of the right front side frame 12 and is configured with a tubular member which extends forward. Similarly to crush cans 72a and 73a of the upper structure 3, the impact absorption members 16 and 17 perform compressive deformation due to an impact load from the front in a phase previous to deformation of the front side frames 11 and 12 and thereby absorb the impact load. As illustrated in FIG. 1, positions, in the front-rear direction, of rear portions of the left and right impact absorption members 16 and 17 and of rear portions of the crush cans 72a and 73a of the upper structure 3 are set to generally the same positions.

The rear portion of the left impact absorption member 16 is fixed to the front portion of the left front side frame 11. A direction in which the left impact absorption member 16 extends is along the longitudinal direction of the left front side frame 11, and an axis line of the impact absorption member 16 is positioned on a forward extension line of the front side frame 11. Further, the rear portion of the right impact absorption member 17 is fixed to the front portion of the right front side frame 12. A direction in which the right impact absorption member 17 extends is along the longitudinal direction of the right front side frame 12, and an axis line of the impact absorption member 17 is positioned on a forward extension line of the front side frame 12.

As illustrated in FIG. 3, FIG. 4 and so forth, the front member 18 is a member which is suspended between the left and right impact absorption members 16 and 17. A portion on a left side of a central portion of the front member 18 in the vehicle width direction is fixed to a front portion of the left impact absorption member 16, and a portion on a right side of the central portion of the front member 18 in the vehicle width direction is fixed to a front portion of the right impact absorption member 17. Accordingly, the left and right impact absorption members 16 and 17 are coupled together by the front member 18. As illustrated in FIG. 1, positions, in the front-rear direction, of the front member 18 and of a front bumper reinforcement 87 of the upper structure 3 are set to generally the same positions, and the front member 18 is positioned directly below the front bumper reinforcement 87.

Modification Example

FIG. 8 illustrates a modification example of the embodiment. In the modification example, the second cross member

19 linearly extends in the vehicle width direction, the left end portion of the second cross member 19 is fixed to the right side surface of the left front side frame 11 by adhesion, welding, fastening members, or the like, and the right end portion of the second cross member 19 is similarly fixed to the left side surface of the right front side frame 12.

The left-side reinforcement member 19A and the right-side reinforcement member 19B extend toward the front-side battery frame 32. Front portions of the left-side reinforcement member 19A and the right-side reinforcement member 19B are fixed to a rear surface of the second cross member 19. The rear portion of the left-side reinforcement member 19A is fixed to the right side surface of the left front side frame 11. The rear portion of the right-side reinforcement member 19B is fixed to the left side surface of the right front side frame 12. In other words, in the modification example, the left-side reinforcement member 19A and the right-side reinforcement member 19B are arranged at the same heights as the front side frames 11 and 12.

Working Effects of Embodiment

Next, a description will be made about a collision of the electric vehicle 1 which is configured as described above. First, a pole collision is presumed in which the electric vehicle 1 collides head-on with a pole extending perpendicularly. In the pole collision, an impact load is input to the left and right crush cans 72a and 73a and the left and right front main frames 72 and 73 via the front bumper reinforcement 87 of the upper structure 3. In this case, the front bumper reinforcement 87 is bent and deformed such that its central portion in the vehicle width direction is positioned in a rearmost position, and the pole enters. Further, the impact load is input to the left and right impact absorption members 16 and 17 and the left and right front side frames 11 and 12 via the front member 18 of the lower structure 2, the front member 18 is bent and deformed, and the pole enters.

The pole which has entered possibly bends the first cross member 15, and the pole thereby enters more deeply. The pole which has more deeply entered exerts a rearward impact load on the second cross member 19. The second cross member 19 on which the rearward impact load is exerted is apt to be bent rearward. In this case, because the reinforcement members 19A and 19B are provided which are positioned in the rear of the second cross member 19 and extend toward the front-side battery frame 32, the second cross member 19 is supported from the rear by the reinforcement members 19A and 19B. Accordingly, because the impact load is transmitted to and absorbed by the front-side battery frame 32, deformation of the second cross member 19 is inhibited, and further an entrance amount of the pole is reduced.

Because the rear portions of the reinforcement members 19A and 19B can be supported from the rear by the frame bracket 40, an effect of inhibiting deformation of the second cross member 19 on which the rearward impact load is exerted can further be enhanced.

Further, because the front portion of the front-side traveling motor M1 is positioned in the vehicle rear of the front portion of the second cross member 19, the pole which has entered in the collision contacts the second cross member 19 before the pole contacts the front-side traveling motor M1. Accordingly, an effect of inhibiting entrance of the pole by the second cross member 19 and the reinforcement members 19A and 19B is sufficiently exhibited.

Next, a left side offset collision is presumed in which an impact load is input from obliquely left front, for example.

In this case, the impact load from the obliquely left front is input to and absorbed by the left crush can 72*a* and the left front main frame 72 via the front bumper reinforcement 87 of the upper structure 3. Further, the impact load from the obliquely left front is input to the left impact absorption member 16 and the left front side frame 11 via the front member 18 of the lower structure 2.

In this case, because the left front side frame 11 is positioned further to the left toward the front and extends so as to correspond to an input direction of the impact load, the impact load from the obliquely left front is input generally along an axis direction of the left front side frame 11. Accordingly, the impact load is absorbed by the left front side frame 11. In addition, the impact load input to the left front side frame 11 is transmitted to the front-side battery frame 32, which configures the battery casing 10, and is thus also absorbed by the front-side battery frame 32. In particular, because the front central member 26 and the first to third rear central members 27 to 29 are arranged in the rear of the front-side battery frame 32 and the front-side battery frame 32 is supported from the rear, the impact load can also be transmitted to and absorbed by the front central member 26 and the first to third rear central members 27 to 29. In addition, the impact load input to the front-side battery frame 32 can also be transmitted to and absorbed by the left-side battery frame 30 and the right-side battery frame 31. In such a manner, the impact load can be absorbed not only by the upper structure 3 but also by the lower structure 2, and in the lower structure 2, the impact load can be dispersed to portions of the highly strong battery casing 10. Note that the same applies to a right side offset collision.

The above-described embodiment is merely an example in all respects and is not to be construed in a limited manner. Furthermore, all modifications and changes belonging to the equivalent scope of the claims are included in the scope of the present invention.

INDUSTRIAL APPLICABILITY

As described in the foregoing, a vehicle-body front structure according to the present disclosure can be provided to an electric vehicle, for example.

REFERENCE SIGNS LIST

1 electric vehicle
10 battery casing
11, 12 front side frame
19 second cross member
19A left-side reinforcement member
19B right-side reinforcement member
20 front suspension apparatus
32 front-side battery frame
40 frame bracket
41 left-side support portion
42 right-side support portion
70 floor panel
A vehicle-body front structure
B battery
M1 traveling motor

The invention claimed is:

1. A vehicle-body front structure of an electric vehicle which includes a traveling motor and in which a battery casing housing a battery supplying electric power to the traveling motor is disposed below a floor panel, the vehicle-body front structure comprising:

a front-side battery frame fixed to a front portion of the battery casing and extending in a vehicle width direction;
a pair of side frames including a left side frame and a right side frame which extend from the front-side battery frame toward a vehicle front;
a cross member coupling the left side frame and the right side frame, the cross member being spaced apart from the front-side battery frame to the vehicle front;
a reinforcement member which extends from an intermediate portion of the cross member toward the front-side battery frame; and
a frame bracket coupling a rear portion of each of the left side frame and the right side frame to the front-side battery frame, wherein the reinforcement member and the pair of the left side frame and the right side frame are disposed at a same height in a vehicle height direction to form a horizontal load transmission path to the front-side battery frame.

2. The vehicle-body front structure according to claim 1, wherein
the left and right side frames are inclined toward vehicle-width-direction outer sides toward the vehicle front.

3. The vehicle-body front structure according to claim 2, wherein
a rear of the reinforcement member abuts the frame bracket.

4. The vehicle-body front structure according to claim 3, wherein
the reinforcement member includes a left-side reinforcement member and a right-side reinforcement member spaced apart from each other in the vehicle width direction, and
the left-side reinforcement member and the right-side reinforcement member are disposed on vehicle-width-direction outer sides toward rear.

5. The vehicle-body front structure according to claim 3, further comprising
a suspension arm forming part of a front suspension apparatus is supported to be swingable around a pivot point directly adjoining a leading edge of the front-side battery frame on a vehicle-width-direction outer side of the frame bracket.

6. The vehicle-body front structure according to claim 5, wherein
a front of the traveling motor is disposed rearward of a front of the cross member.

7. The vehicle-body front structure according to claim 6, wherein
an intermediate portion of the cross member in the vehicle width direction is below a lower surface of the side frames, and
the reinforcement member extends from the intermediate portion of the cross member in the vehicle width direction toward the front-side battery frame below the left and right side frames.

8. The vehicle-body front structure according to claim 5, wherein
an intermediate portion of the cross member in the vehicle width direction is below a lower surface of the side frames, and
the reinforcement member extends from the intermediate portion of the cross member in the vehicle width direction toward the front-side battery frame below the left and right side frames.

9. The vehicle-body front structure according to claim 4, wherein an intermediate portion of the cross member in the vehicle width direction is below a lower surface of the side frames, and the reinforcement member extends from the intermediate portion of the cross member in the vehicle width direction toward the front-side battery frame below the left and right side frames.

10. The vehicle-body front structure according to claim 4, wherein a front of the traveling motor is disposed rearward of a front of the cross member.

11. The vehicle-body front structure according to claim 3, wherein an intermediate portion of the cross member in the vehicle width direction is below a lower surface of the side frames, and the reinforcement member extends from the intermediate portion of the cross member in the vehicle width direction toward the front-side battery frame below the side frames.

12. The vehicle-body front structure according to claim 3, wherein a front of the traveling motor is disposed rearward of a front of the cross member.

13. The vehicle-body front structure according to claim 2, wherein the reinforcement member includes a left-side reinforcement member and a right-side reinforcement member spaced apart from each other in the vehicle width direction, and the left-side reinforcement member and the right-side reinforcement member are disposed on vehicle-width-direction outer sides toward rear.

14. The vehicle-body front structure according to claim 2, wherein an intermediate portion of the cross member in the vehicle width direction is below a lower surface of the side frames, and the reinforcement member extends from the intermediate portion of the cross member in the vehicle width direction toward the front-side battery frame below the left and right side frames.

15. The vehicle-body front structure according to claim 2, wherein a front of the traveling motor is disposed rearward of a front of the cross member.

16. The vehicle-body front structure according to claim 1, wherein a rear of the reinforcement member abuts the frame bracket.

17. The vehicle-body front structure according to claim 1, wherein the reinforcement member includes a left-side reinforcement member and a right-side reinforcement member spaced apart from each other in the vehicle width direction, and the left-side reinforcement member and the right-side reinforcement member are disposed on vehicle-width-direction outer sides toward rear.

18. The vehicle-body front structure according to claim 1, wherein a front of the traveling motor is disposed rearward of a front of the cross member.

19. The vehicle-body front structure according to claim 1, wherein an intermediate portion of the cross member in the vehicle width direction is below a lower surface of the side frames, and the reinforcement member extends from the intermediate portion of the cross member in the vehicle width direction toward the front-side battery frame below the left and right side frames.

20. A vehicle-body front structure of an electric vehicle which includes a traveling motor and in which a battery casing housing a battery is disposed below a floor panel, the vehicle-body front structure comprising:

a front-side battery frame fixed in a front portion of the battery casing and extending in a vehicle width direction;

a pair of side frames including a left side frame and a right side frame which extend from the front-side battery frame toward a vehicle front;

a cross member coupling the left side frame and the right side frame;

a reinforcement member which extends toward a vehicle rear from the cross member toward the front-side battery frame; and a suspension arm forming part of a front suspension apparatus, wherein the reinforcement member and the pair of the left side frame and the right side frame are disposed at a same height in a vehicle height direction to form a horizontal load transmission path to the front-side battery frame, and the suspension arm is supported to be swingable around a pivot point directly adjoining a leading edge of the front-side battery frame.

* * * * *